United States Patent
Hearty et al.

(10) Patent No.: US 10,743,069 B2
(45) Date of Patent: Aug. 11, 2020

(54) DELIVERY OF INFORMATION RELATED TO DIGITAL RIGHTS MANAGEMENT (DRM) IN A TERRESTRIAL BROADCAST SYSTEM

(71) Applicant: Sony Corporation, Tokyo (JP)

(72) Inventors: Paul Joseph Hearty, Poway, CA (US); Mark Kenneth Eyer, Woodinville, WA (US)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 16/214,933

(22) Filed: Dec. 10, 2018

(65) Prior Publication Data
US 2020/0186882 A1 Jun. 11, 2020

(51) Int. Cl.
*H04N 7/167* (2011.01)
*H04N 21/4627* (2011.01)
*H04N 21/4623* (2011.01)
*H04N 21/266* (2011.01)

(52) U.S. Cl.
CPC ... *H04N 21/4627* (2013.01); *H04N 21/26606* (2013.01); *H04N 21/4623* (2013.01)

(58) Field of Classification Search
CPC ......... H04N 21/4623; H04N 21/26606; H04N 7/1675; H04N 21/26266; H04N 21/2347; H04N 21/4405; H04N 21/4181
See application file for complete search history.

(56) References Cited

U.S. PATENT DOCUMENTS

| | | | | |
|---|---|---|---|---|
| 6,005,938 A * | 12/1999 | Banker | ............... | H04L 63/04 348/E5.004 |
| 6,373,904 B1 * | 4/2002 | Sakamoto | ............ | H04H 40/18 375/316 |
| 6,393,562 B1 * | 5/2002 | Maillard | ............... | G06F 9/4843 713/150 |
| 6,584,199 B1 * | 6/2003 | Kim | .................. | H04N 7/163 380/203 |
| 6,920,222 B1 * | 7/2005 | Tsukahara | ............. | H04N 7/163 348/E7.056 |
| 8,401,191 B2 * | 3/2013 | Chen | .................... | H04N 7/1675 380/239 |
| 9,002,006 B2 | 4/2015 | Chen et al. | | |
| 2005/0198680 A1 * | 9/2005 | Baran | ............... | H04L 29/06027 725/88 |
| 2006/0004661 A1 * | 1/2006 | Bacon | .................... | H04N 7/163 705/50 |
| 2007/0098165 A1 * | 5/2007 | Yoshikawa | ............ | G06Q 30/02 380/211 |
| 2009/0136203 A1 | 5/2009 | Stam et al. | | |
| 2012/0307654 A1 | 12/2012 | Pantos et al. | | |
| 2013/0326553 A1 * | 12/2013 | Nicolas | ............. | H04N 21/4383 725/25 |

(Continued)

FOREIGN PATENT DOCUMENTS

WO 2016140479 A1 9/2016
WO 2016178494 A1 11/2016

(Continued)

OTHER PUBLICATIONS

"ATSC Standard: ATSC 3.0 Interactive Content", Advanced Television Systems Committee, Dec. 18, 2017.

(Continued)

*Primary Examiner* — Jason Salce
(74) *Attorney, Agent, or Firm* — John L. Rogitz

(57) ABSTRACT

Techniques are described for efficient delivery and reception of information, such as an Entitlement Management Message (EMM), that is related to Digital Rights Management (DRM) in a terrestrial broadcast system such as ATSC 3.0.

11 Claims, 5 Drawing Sheets

(56) References Cited

U.S. PATENT DOCUMENTS

| | | | |
|---|---|---|---|
| 2013/0332976 A1* | 12/2013 | Shenker | H04N 21/26606 725/114 |
| 2014/0325572 A1 | 10/2014 | Yie et al. | |
| 2015/0100996 A1 | 4/2015 | Freeman et al. | |
| 2015/0195327 A1 | 7/2015 | Bouazizi et al. | |
| 2015/0281799 A1 | 10/2015 | Lim | |
| 2016/0234348 A1 | 8/2016 | Mao et al. | |
| 2016/0234355 A1 | 8/2016 | Lee et al. | |
| 2016/0234682 A1* | 8/2016 | Mandyam | G06F 21/10 |
| 2016/0360288 A1 | 12/2016 | Mandyam et al. | |
| 2017/0054520 A1 | 2/2017 | Kwak et al. | |
| 2017/0134763 A1 | 5/2017 | Hwang et al. | |
| 2017/0374429 A1 | 12/2017 | Yang | |
| 2018/0288468 A1 | 10/2018 | Yamagishi et al. | |
| 2018/0373847 A1* | 12/2018 | Lo | H04N 21/2541 |
| 2019/0058909 A1* | 2/2019 | Eyer | H04N 21/4627 |
| 2019/0246148 A1* | 8/2019 | Oh | H04N 21/643 |

FOREIGN PATENT DOCUMENTS

| | | | |
|---|---|---|---|
| WO | 2016190720 A1 | 12/2016 | |
| WO | 2017184648 A1 | 10/2017 | |
| WO | 2018202768 A1 | 11/2018 | |

OTHER PUBLICATIONS

Charlemagne Aguilar Santos, Tanmay Agnihotri, "ATSC 3.0 Advertising Notification Using Event Streams", file history of related U.S. Appl. No. 16/275,078, filed Feb. 13, 2019.

Agnihotri et al., "ATSC 3.0 Playback Using MPEG Media Transport Protocol (MMTP)", related U.S. Appl. No. 15/925,190, Non-Final Office Action dated Dec. 9, 2019.

Agnihotri et al., "ATSC 3.0 Playback Using MPEG Media Transport Protocol (MMTP)", related U.S. Appl. No. 15/925,190, Applicant's response to Non-Final Office Action filed Dec. 13, 2019.

Kim et al., "Method of DASH segments into a MMTP stream for switching contents under a hybrid broadcasting environment" (2017).

Xu et al., "DASH and MMT and their Applications", (2016).

"ATSC 3.0 Standards", retrieved on Feb. 16, 2018 from https://www.atsc.org/standards/atsc-3-0-standards/.

"ATSCaster—ROUTE and MMTP server for ATSC 3.0", ENENSYS, Jul. 2018.

"ISO/IEC 23009-5:2017—Information technology—Dynamic adaptive streaming over HTTP (DASH)—Part 5: Server and network assisted DASH (SAND)", May 2017.

I. Bouazizi, "MPEG Media Transport Protocol (MMTP)", Samsung Research America, Mar. 4, 2014.

Agnihotri et al., "ATSC 3.0 Playback Using MPEG Media Transport Protocol (MMTP)", related U.S. Appl. No. 15/925,190, Final Office Action dated Mar. 13, 2020.

Agnihotri et al., "ATSC 3.0 Playback Using MPEG Media Transport Protocol (MMTP)", related U.S. Appl. No. 15/925,190, Applicant's response to Final Office Action filed Mar. 19, 2020.

Tanmay Agnihotri, "Advanced Television Systems Committee (ATSC) 3.0 Latency-Free Display of Content Attribute", file history of related U.S. Appl. No. 16/710,746, filed Dec. 11, 2019.

* cited by examiner

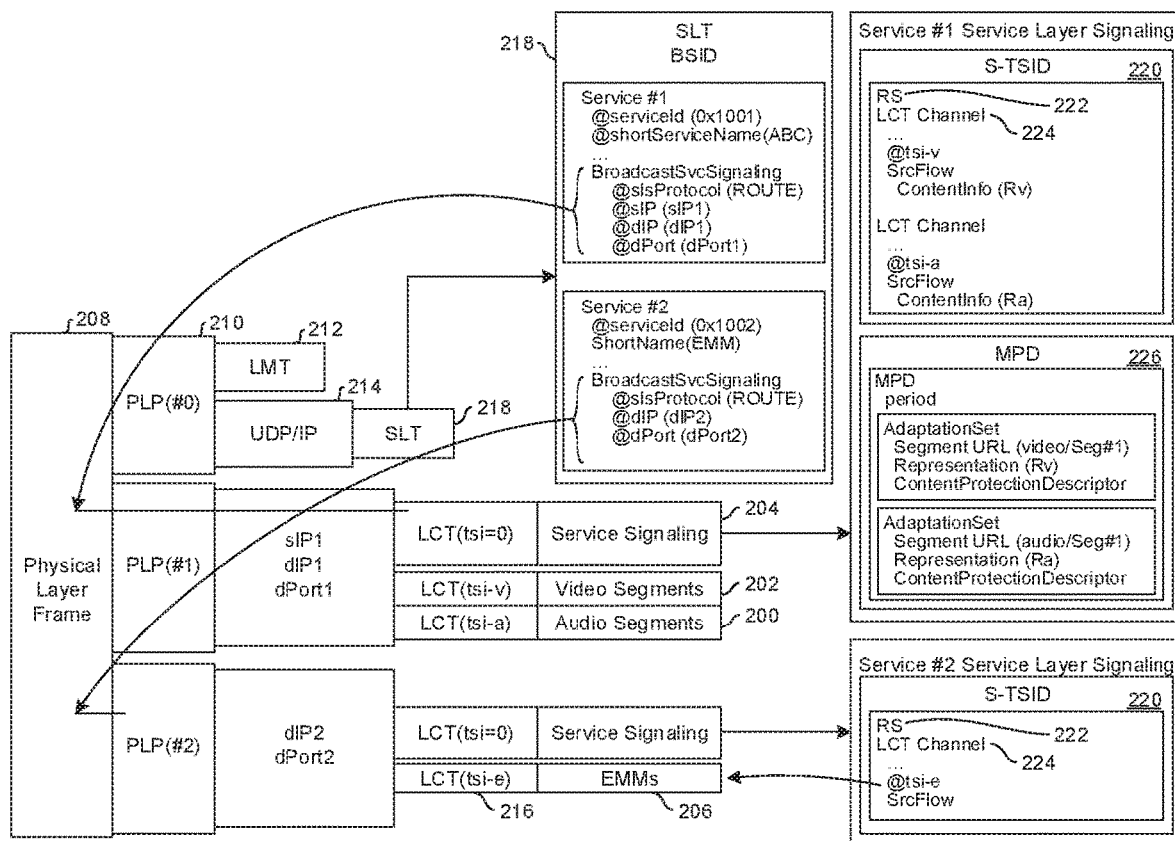
FIG. 2  Service and EMM Transport

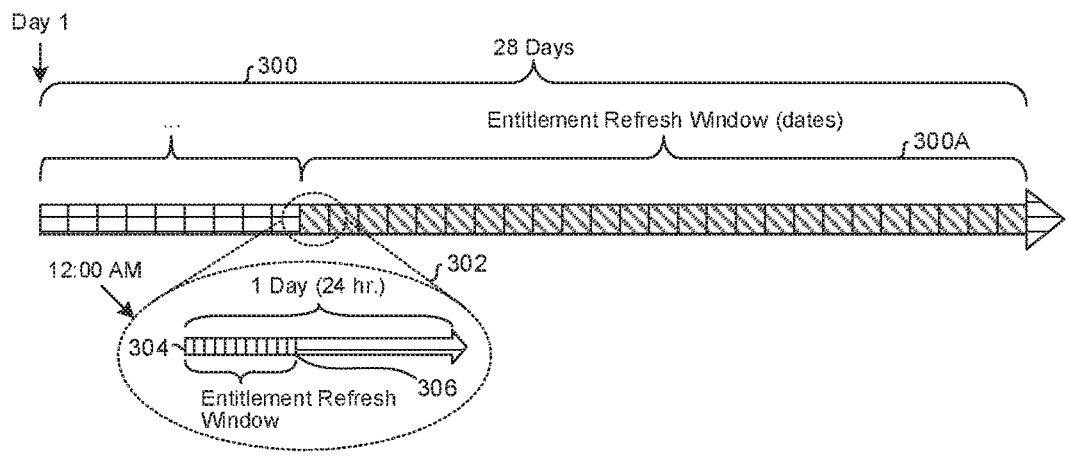
FIG. 3 Entitlement Refresh Window
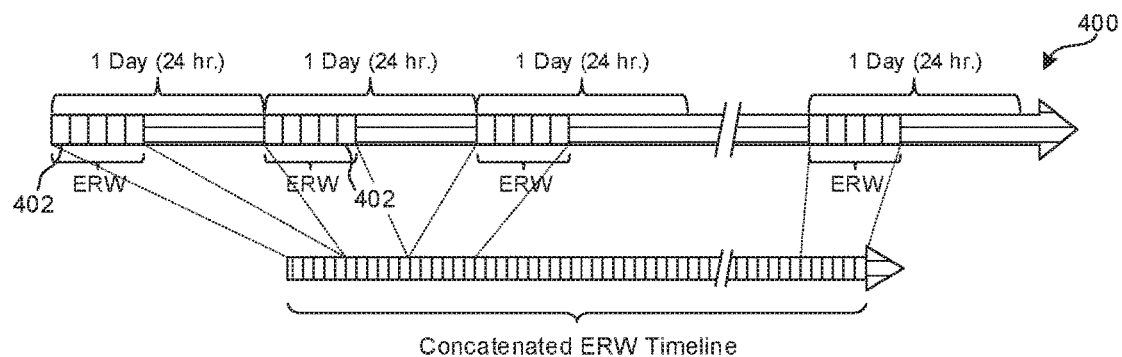
FIG. 4 Concatenated ERW Timeline
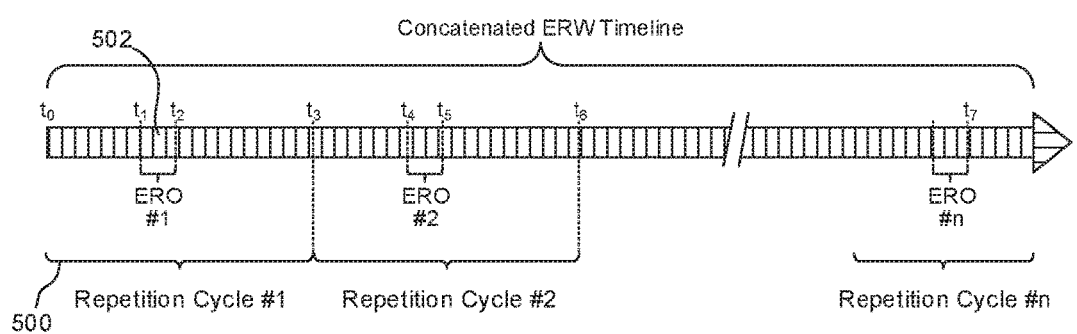
FIG. 5 EMM Delivery in the Concatenated ERW Timeline

DELIVERY OF INFORMATION RELATED TO DIGITAL RIGHTS MANAGEMENT (DRM) IN A TERRESTRIAL BROADCAST SYSTEM

FIELD

This patent application relates generally to delivering information related to DRM, such as Entitlement Management Messages (EMMs), in a terrestrial broadcast system, such as an Advanced Television System Committee (ATSC) 3.0 system.

BACKGROUND

ATSC 3.0 is an Internet Protocol (IP)-based broadcasting standard that provides end-to-end delivery of IP-based content. ATSC 3.0 allows service providers to provide protected, as well as unprotected, content. In such systems, for the protected content, an efficient mechanism for the delivery and reception of rights (e.g., DRM-related information) to access such content is needed.

Broadcast television receivers, by their nature, receive a signal from whichever broadcast signal the user has chosen based on the service the user has selected. Broadcast signals often carry a plurality of services in their digital multiplex. In ATSC 1.0 these services are called "virtual channels," whereas ATSC 3.0 refers to them as "services".

An ATSC Service is a collection of media components and/or metadata delivered to receivers in aggregate. Components may be of multiple media types. A service may be either continuous or intermittent. A service can be real time or non-real time, and real time services can include a sequence of TV programs.

In ATSC 3.0, a service can be an application that may or may not have live broadcast streaming audio/video content. A service may also include non-real-time content such as video-on-demand, or other interactive content like one might find on a web page. Also, some or all components of an ATSC 3.0 service may be delivered via the broadband (interpret) path. A service that includes components from both broadcast and broadband is called a "hybrid" service.

An EMM typically provides access to one or more services, for a limited period, typically one month, by means of the decryption keys necessary to decrypt the content it contains. Each EMM targets an individual receiver; the information contained within it is cryptographically tied to secure information contained within the target receiver. If a receiver can access the EMM that grants access to a service, such access will continue for a period of time even if no further EMMs are found. Like a magazine subscription, if the subscription period comes to an end for an access-controlled service and no renewal is forthcoming, the receiver's access to that service terminates. The expiration feature ensures that a user cannot continue to receive access simply by blocking reception of EMMs. An EMM may itself revoke access; in that case reception of the EMM would result in the receiver terminating access to the associated service or services.

SUMMARY

As understood herein, while an ATSC 3.0 receiver can access the EMMs it needs to access protected content over a broadband network which it can use to directly access a key server, for various reasons the connection may not occur. For example, some users do not set up the necessary wired or Wi-Fi connection between the receiver and the user's home network, or the network password may be changed and the user neglects to update the receiver, resulting in loss of access to the Internet. As also understood herein, EMMs may be delivered within the over-the-air broadcast, but not every target receiver is continuously tuned to the broadcaster's signal. Consequently, a method is needed that can facilitate the efficient delivery of EMMs in the broadcast receiver environment, leading to a better chance that each receiver will have the EMM needed for access to a service the user is entitled to view.

Accordingly, a reception apparatus includes receiver circuitry configured to receive a broadcast signal, and processing circuitry configured to extract data packets containing rights information from the broadcast signal. The processing circuitry is configured to determine whether the broadcast signal includes a content protected with a digital rights management (DRM) service that is supported by the reception apparatus based on service category information in the service information for a plurality of services in the broadcast signal. The processing circuitry is also configured to acquire Entitlement Management Messages (EMMs), which are associated with the reception apparatus and delivered in a DRM service, based at least in part on an identification of the reception apparatus.

In the examples to follow, the broadcast signal comprises an Advanced Television System Committee (ATSC) 3.0 signal.

In non-limiting implementations, the instructions may be executable to acquire the EMMs at least in part by determining one or more entitlement reception opportunities derived based at least in part on the identification of the reception apparatus. In some examples, the instructions are executable to acquire the EMMs at least in part by determining one or more entitlement reception opportunities derived based at least in part on the identification of the reception apparatus and a number of days with entitlement refresh windows during which at least one EMM is broadcast. If desired, the instructions can be executable to acquire the EMMs at least in part by determining one or more entitlement reception opportunities derived based at least in part on the identification of the reception apparatus and a duration of at least one entitlement refresh window during which at least one EMM is broadcast. Example instructions may be executable to acquire the EMMs at least in part by determining one or more entitlement reception opportunities derived based at least in part on the identification of the reception apparatus and a period of at least one repetition cycle of EMM broadcast. The instructions may be executable to acquire the EMMs at least in part by determining one or more entitlement reception opportunities derived based at least in part on the identification of the reception apparatus, a number of days with entitlement refresh windows during which at least one EMM is broadcast and a duration of at least one entitlement refresh window during which at least one EMM is broadcast. Example instructions can be executable to determine one or more entitlement reception opportunity periods derived based at least in part on the identification of the reception apparatus, a number of days with entitlement refresh windows during which at least one EMM is broadcast, a duration of at least one entitlement refresh window during which at least one EMM is broadcast, and a period of at least one repetition cycle of EMM broadcast.

In another aspect, a method includes determining, at a reception apparatus, one or more entitlement reception opportunity periods based at least in part on combining an identification of the reception apparatus with information received from a service provider associated with a broadcast signal. Based on determining one or more entitlement reception opportunity periods, the method includes configuring a receiver in the reception apparatus to receive the broadcast signal during at least one of the entitlement reception opportunity periods. The method further includes accessing at least one digital rights management (DRM) element in the broadcast signal during the at least one of the entitlement reception opportunity periods and using the DRM element to configure the reception apparatus to play content from the service provider.

In the examples, the information received from the service provider that is combined with the identification of the reception apparatus includes transmission scheduling information. Example transmission scheduling information includes a number of days with entitlement refresh windows during which the DRM element is broadcast, a duration of at least one entitlement refresh window during which DRM element is broadcast, at least one repetition cycle of DRM element broadcast, and a duration of at least one entitlement refresh window during which DRM element is broadcast, and combinations thereof.

In another aspect, a computer memory that is not a transitory signal includes instructions executable by at least one processor to determine, at a reception apparatus, one or more entitlement reception opportunity periods based at least in part on combining an identification of the reception apparatus with information received from a service provider associated with a broadcast signal. The instructions are executable to, based on determining one or more entitlement reception opportunity periods, configure a receiver in the reception apparatus to receive the broadcast signal during at least one of the entitlement reception opportunity periods, and to access at least one digital rights management (DRM) element in the broadcast signal during the at least one of the entitlement reception opportunity periods. The instructions also are executable to use the DRM element to configure the reception apparatus to play content from the service provider.

In another aspect, a service distribution system includes processing circuitry configured to determine one or more entitlement reception opportunity periods based at least in part on combining an identification of a reception apparatus with information from a service provider associated with a broadcast signal. The circuitry is further configured to, based on determining one or more entitlement reception opportunity periods, send to the reception apparatus the broadcast signal during at least one of the entitlement reception opportunity periods. The circuit is configured to provide in the broadcast signal at least one digital rights management (DRM) element during the at least one of the entitlement reception opportunity periods, and to provide content to the reception apparatus requiring the DRM element to play the content.

According to an embodiment, a reception apparatus includes receiver circuitry configured to receive a broadcast signal and processing circuitry configured to extract data packets containing rights information (e.g. EMMs) from the broadcast signal. The processing circuitry is configured to determine whether the broadcast stream includes a content protected with a digital rights management (DRM) service that is supported by the reception apparatus based on service category information in the service information for the plurality of services in the broadcast signal. Further, the processing circuitry is configured to acquire DRM-related information, which is associated with the reception apparatus and delivered in the DRM service, based on a determination that the broadcast stream includes the DRM service that is supported by the reception apparatus.

According to an embodiment of the present disclosure, a method of a reception apparatus for acquiring Entitlement Management Messages (EMMs) includes receiving a broadcast stream and extracting a Service List Table (SLT) from h broadcast stream. The sur includes service information for each of a plurality of services in the broadcast stream. The method includes determining, by processing circuitry of the reception apparatus, whether the broadcast stream includes a DRM service that is supported by the reception apparatus based on service category information in the service information for the plurality of services in the broadcast stream. Further, the method includes acquiring the Entitlement Management Messages (EMMs) associated with the reception apparatus and delivered in the DRM service, based on a determination that the broadcast stream includes the DRM service that is supported by the reception apparatus.

According to an embodiment of the present disclosure, a non-transitory computer-readable medium, stores instructions which when executed by a computer cause the computer to perform a method of a reception apparatus for acquiring digital rights management (DRM)-related information. The method includes determining whether the broadcast and/or broadband stream includes a DRM service that is supported by the reception apparatus based on service category information in the service information for the plurality of services in the broadcast stream. Further, the method includes acquiring the DRM-related information, which is associated with the reception apparatus and delivered in the DRM service, based on a determination in the determining that the broadcast stream includes the DRM service that is supported by the reception apparatus.

According to an embodiment of the present disclosure, a service distribution system includes processing circuitry configured to generate a service list table (SLT). The SLT includes service information for each of a plurality of services to be transmitted in a broadcast stream. Each item of the service information includes category information for a respective one of the plurality of services. The processing circuitry is configured to generate the broadcast stream including the SLT and the plurality of services for transmission. Further, the processing circuitry is configured to deliver Entitlement Management Messages (EMMs) in a DRM service of the plurality of services in the broadcast stream. The service category information included in the SLT for the DRM service identifies it as a DRM service.

The details of the present application, both as to its structure and operation, can best be understood in reference to the accompanying drawings, in which like reference numerals refer to like parts, and in which:

BRIEF DESCRIPTION OF THE DRAWINGS

FIG. 2 is a schematic diagram to illustrate an example of service transport structure and signaling;

FIGS. 3-5 are timelines illustrating broadcast delivery of DRM information;

DETAILED DESCRIPTION

Figure 1:
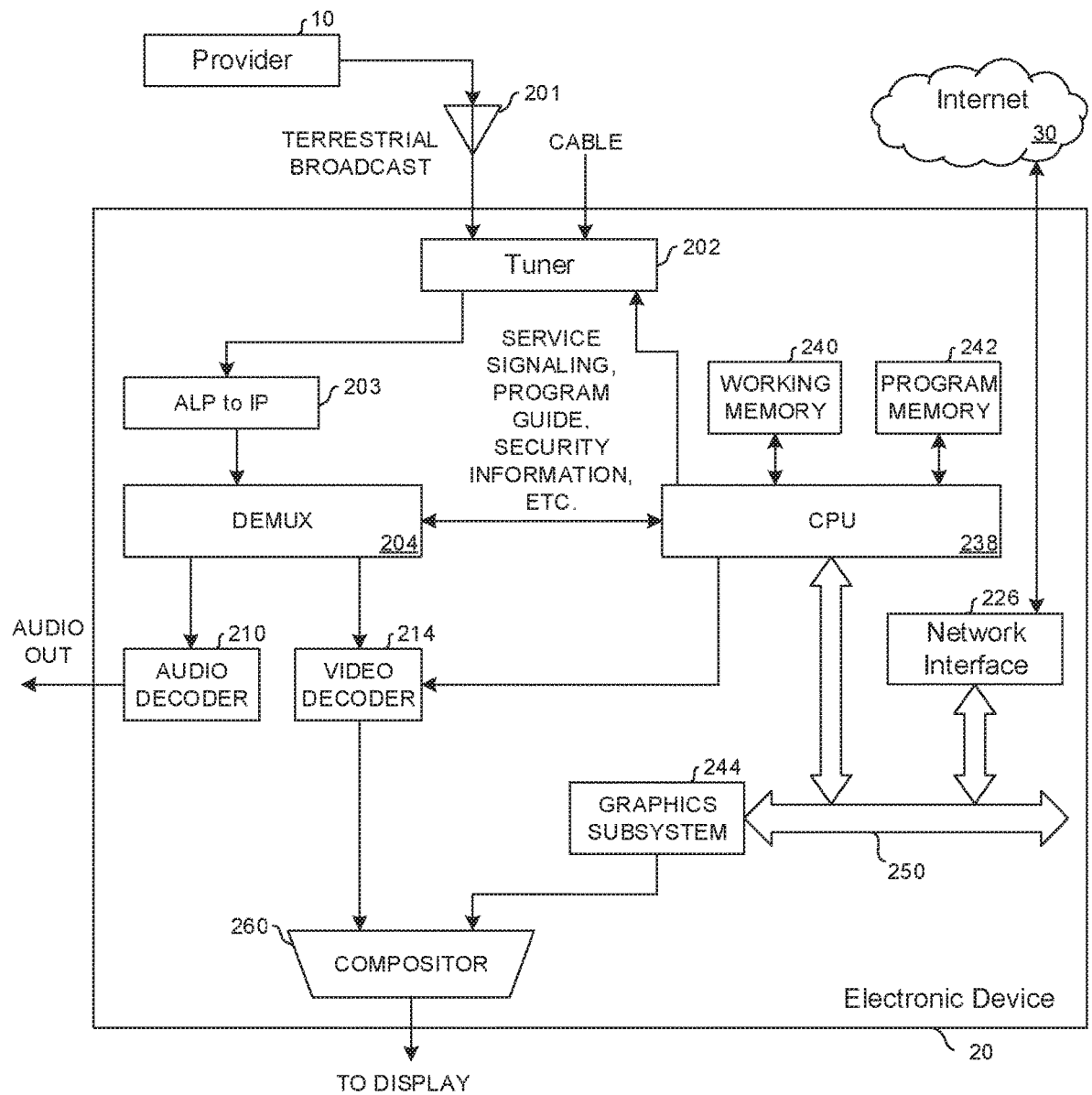
FIG. 1 is a block diagram of an example broadcast system consistent with present principles.

This disclosure relates generally to computer ecosystems including aspects of computer networks that may include consumer electronics (CE) devices. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C # or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, a service provider 10 can broadcast content to a reception apparatus 20, corresponding to a digital television broadcast system according to one embodiment.

The service provider (e.g., a broadcaster entity or broadcast station) 10, in one embodiment, may include a service distribution system that includes a transmission apparatus with a transmitter that is configured to transmit one or more services in a data stream (e.g., a broadcast stream) to the reception apparatus 20. The transmitter is configured to provide the data stream to the reception apparatus 20, for example via a digital terrestrial broadcast that the apparatus 20 receives at one or more antennas 201. In other examples, the data stream may be transmitted to the reception apparatus 20 over one or a combination of the digital terrestrial broadcast, a mobile phone network, a broadband network such as the Internet, a cable network, and a satellite link. The service distribution system may use any one or a variety of transmission techniques to communicate the data stream to the reception apparatus 20.

The service generation and distribution system according to one embodiment includes a source encoder, a channel encoder, and a modulator. The source encoder includes data, audio, and video encoders to compress the audio, video, signaling, control or other data received from a source. The channel encoder randomizes, interlaces, channel codes, and frame maps the compressed and signaling data. For example, the channel encoder includes a frame builder that forms many data cells into sequences to be conveyed on Orthogonal frequency-division multiplexing (OFDM)) symbols. The modulator (e.g., a multiplexer) converts the processed digital data into modulation symbols, which can be, for example OFDM symbols in the case of the ATSC 3.0 standard). The multiplexed data is then passed to an inverse fast Fourier transformer (IFFT) which transforms a frequency domain signal into a time domain signal. The time domain signal is fed to a guard insertion module for generating a guard interval (GI) between symbols and then to a digital-to-analog (D/A) converter. Then, up-conversion, RF amplification, and over-the air broadcasting are performed to transmit a broadcast stream.

Certain components of the transmission apparatus or the reception apparatus may not be necessary in other embodiments. Details of an OFDM transmitter and receiver may be found, for example, in the DVB-T2 standard (ETSI EN 302 755), ATSC Standard A/322—Physical Layer Protocol (Doc. A/322:2017), and ATSC Standard A/321—System Discovery and Signaling (Doc. A/321:2016) which are incorporated herein by reference.

The reception apparatus 20 may be a fixed or mobile device such as a television set, a set top box, smartphone, tablet computer, laptop, portable computer, or any other device configured to receive television content. Further, the reception apparatus 20 may be a digital television receiver that is incorporated in a vehicle or any of the fixed or mobile devices described above.

The reception apparatus 20 includes receiver circuitry that is configured to receive a data stream (e.g., a broadcast stream) from one or more service providers 10 and processing circuitry that is configured to perform various functions of the reception apparatus 20. In one embodiment, a tuner/demodulator 202 receives broadcast emissions containing the broadcast stream. Depending on the embodiment, the reception apparatus 20 may alternatively or additionally be configured to receive a cable television transmission or a satellite broadcast. The tuner/demodulator 202 receives the data stream which may be converted from ATSC link-layer protocol (ALP) to Internet Protocol (IP) by a converter 203 and then the IP demultiplexed by a demultiplexer 204 or handled by middleware and separated into audio and video (A/V) streams. The audio is decoded by an audio decoder 210 and the video is decoded by a video decoder 214. Further, uncompressed A/V data may be received via an uncompressed A/V interface (e.g., a HDMI interface), if available.

The reception apparatus 20 generally operates under control of at least one processor, such as a processor 238 that may be embodied as a central processing unit (CPU), which can be coupled to a working memory 240, program memory 242, and a graphics subsystem 244 via one or more buses (e.g., bus 250). The processor 238 receives DRM-related information, program guide information, and signaling information from the demultiplexer 204 for acquiring the DRM-related information according to one embodiment. The processor 238 may provide appropriate security information such as DRM information to the video decoder 214. The graphics outputted by the graphics subsystem 244 may be combined with video images by a compositor and video interface 260 to produce an output suitable for display on a video display.

The processor 238 may operate to carry out functions of the reception apparatus 20 including processing related to presenting protected services or content, and acquisition of the DRM-related information needed for the presentation. Further, the processor 238 may operate to execute script objects (control objects) contained in the application (e.g., HTML5 application), Broadcaster Applications (BA), etc., using for example a browser stored in the program memory 242.

The processor 238 may be coupled to any one or a combination of the reception apparatus 20 resources to centralize control of one or more functions, in certain embodiments. In one embodiment, the processor 238 also operates to oversee control of the reception apparatus 20 including the tuner/demodulator 202 and other television resources. In examples, the processor 238 may communicate with a wide area network such as the Internet 30 using a network interface 226 such as a wired or wireless modem or other appropriate interface that may be connected to the bus 250.

FIG. 2 schematically illustrates certain signaling associated with a first service, denoted "Service #1" in FIG. 2. As shown, a broadcast television service can include streaming audio and video components 200, 202 as well as service signaling components 204 and digital rights management (DRM) elements 206 such as may be embodied in Entitlement Management Messages (EMMs). In the example shown, Service #1 is content-protected, meaning that a given receiver must have received rights as embodied in DRM elements to present the content of the service based on reception of an associated Entitlement Management Message (EMM) specific to that receiver.

FIG. 2 shows that a physical layer frame 208 may include plural Physical Layer Pipes (PLP) 210 as defined in publication A/322. A first PLP can include a Link Mapping Table (LMT) 212 (see ATSC "Link Layer Protocol" publication A/330, incorporated herein in its entirety) and a User Datagram Protocol/Internet Protocol (UDP/IP) element 214. Transport of the illustrated data elements may be implemented using Real-Time Object Delivery over Unidirectional Transport (ROUTE) (as set forth in "Signaling, Delivery, Synchronization, and Error Protection," A/331 dated Dec. 6, 2017, incorporated herein in its entirety.

As also shown, one or more PLPs may include respective Layered Coding Transport (LCT) elements 216 (as defined in A/331). Some LCTs may be associated with service signaling information 204 and A/V/content 200, 202 while other LCTs may be associated with service signaling 204 and DRM elements 206 as shown.

FIG. 2 shows that a UDP/IP transport channel 214 may be associated with a Service List Table (SLT) 218, which can describe services included in the broadcast (two services illustrated in FIG. 2). In the example, Service #1 is an audio/video service while Service #2 defines a streaming delivery path for EMMs. A method by which a service listed in the SLT is identified as being an EMM service is described in U.S. patent application Ser. No. 15/680,068, incorporated herein by reference.

FIG. 2 also illustrates that service signaling 200 may include Service-based Transport Session Instance Description (S-TSID) 220 as defined in publication see A/331. The S-TSID 220 may include one or more ROUTE Sessions 222 and LCT channels 224, as well as S-TSID elements and attributes labeled SrcFlow, ContentInfo.

Some service signaling may be associated with Media Presentation Description (MPD) information 226, as defined in ISO/TEC 23009-1 MPEG DASH, and A/331. As described in A/331, the EMMs can be delivered in a ROUTE session, which is a method for delivery of file-based objects over a digital terrestrial broadcast signal.

In the example given in FIG. 2, a receiver might determine that EMMs associated with a DRM system it supports are available in an LCT channel associated with Service #2. It would then begin to monitor the appropriate IP packets (and the PLP that delivers those packets) to look for EMMs targeted to itself. According to present principles, the receiver determines the optimum timing for monitoring this EMM service, which may involve tuning back to this broadcast signal at a later time (for example, in the middle of the night on a particular day).

Note that the arrangement shown in FIG. 2 is an example technique. Although the example shows that the EMMs are delivered in PLP #2, they could just as well be delivered in PLP #0 or PLP #1. Different PLPs can use different methods of physical layer encoding, involving tradeoffs between bandwidth usage and robustness against errors in the transmission channel. Likewise, different methods of signaling which LCT channel in the broadcast carries the EMMs may be employed, such as including the signaling for the EMM service for a given service in the S-TSID entry for that service.

Prior to moving on to FIG. 3, additional terms and acronyms are defined as follows.

Entitlement Refresh Window (ERW): A time range set by the broadcaster comprising hours of day (e.g., off-hours, such 0200 to 0400 Local), combined with a date range.

Reception Apparatus Identifier (RAI): A unique value such as a unit or serial number associated with the reception apparatus.

Pseudorandom Process: An algorithm used to generate a pseudorandom number based on the Reception Apparatus Identifier. Such algorithm is used both by the broadcaster's entitlement management system to identify times within the Entitlement Refresh Window at which to insert unit-directed entitlements and by the reception apparatus to identify times at which to tune to the broadcaster's channel to receive unit-directed entitlements.

Entitlement Send/Receive Synchronization: The use of the same algorithm with the same Reception Apparatus Identifier by both the broadcaster's entitlement system and the individual reception apparatus to assure that both generate the same basis for entitlement reception time.

Entitlement Reception Opportunities (ERO): Periods of time determined by a given receiver to correspond with a broadcaster's scheduled delivery of EMMs targeted to this receiver. Each receiver can derive one or more ERO periods scheduled to occur during the month. Each ERO will occur within an Entitlement Refresh Window, though not all days may include an ERO.

Entitlement Signal Robustness Factor (ESRF): It is possible that the entitlement might be missed by the reception apparatus due to, for example, transmission corruption or loss or differences in nominal time of day between the entitlement management system, and the reception apparatus. To compensate for this, the entitlement message might be repeated multiple times (the ESRF) in and around each ERO. The ESRF value may be communicated to the reception apparatus during initial authorization of the reception apparatus or by other signaling means. In some systems, the value of ESRF is not directly communicated; the receiver will monitor the broadcast during an ERO and simply attempt to retrieve the first or one of the repeat transmissions of the EMM.

Reception Apparatus Availability Factor (RAAF): It is possible that the reception apparatus may not be available to monitor the broadcast during one of the EDOs because it is engaged in receiving another service, is processing a download or an Emergency Alert, or is experiencing an interruption in power or service. To compensate for this, the entitlement message might be repeated multiple times over the period of the ERW. As mentioned, the algorithm that determines the EDOs for a given receiver is common between the entitlement management system and reception apparatus, thus the number of EDOs within a month, the RAAF, depends on that algorithm.

In FIG. 3, the top line 300 depicts the last 28 days of a month (or in the case of a February that is not in a leap year, all the days in the month). The shaded area 300A indicates the part of the month that includes days in which ERW periods appear. The expansion 302 of the first day of the month in which ERW periods are present illustrates that EMMs will be delivered between midnight 304 and 0400m local time 306, on each of the identified days in this month.

Signaling in the broadcaster's (service provider's) emission signal may announce the days during the month that an ERW will be present, as well as the period of time within the day in which the ERW will be open during each of the identified days.

To optimize the delivery and reception of DRM elements such as the monthly EMM by appropriate signaling to the receiver to indicate possible times the EMM appropriate for that receiver can be retrieved, an aspect herein involves specification of the timing of ERWs available during certain days of the month. Another aspect involves synchronization between the broadcaster-managed EMM delivery system and each receiver as to the timing of the delivery of the EMM specific to that receiver. Were each receiver to monitor the broadcaster's signal during the entire duration of each ERW on each day of the month in which ERW's are sent, this would be a very inefficient use of the receiver's resources. It would also be unreliable, as receivers typically cannot monitor more than one broadcaster's signal at any given time (and they may need to retrieve EMMs from a multitude of broadcasters during the month).

This present disclosure describes the concept of an algorithm that determines the schedule the broadcaster will use to deliver the EMM specific to a given receiver (or class of receivers) at a particular time (or times) within the ERW periods throughout the month. The scheduling is based on the fact that both the receiver and the broadcaster know the value of an identifier that uniquely references the receiver. In this description, this identifier is called the Reception Apparatus Identifier (RAI).

Thus, using its RAI value, the receiver can determine that an EMM may be retrieved from the broadcaster's signal during (as one example) the third 25-minute period of every seventh day in the month in which ERWs are available, beginning at the third day of that set of days.

In another embodiment, all the time periods defined by each of the ERWs in the month may be considered to be concatenated into one timeline. A concatenated timeline 400 is illustrated in FIG. 4. In this case, the agreed algorithm determines one or more windows 402 within the concatenated timeline during which the EMM for a given receiver will be delivered.

FIG. 5 illustrates further details of a concatenated ERW timeline, formed conceptually by the concatenation of each ERW delivered within the month. In this example, EMMs for all receivers in the system are delivered during each repetition cycle 500, and as shown there are n Repetition Cycles during the month.

The Algorithm known by the receiver and used by both the broadcaster/EMM provider and the receiver is used by the receiver to derive the ERO within each Repetition Cycle. Another way to say it is that the Algorithm identifies one or more EROs within the month for each receiving apparatus to use.

In FIG. 5, the Concatenated ERW Timeline begins at $t_0$. The duration of each Repetition Cycle 500 within an ERW is equal to the period between $t_0$ and $t_3$ (if $t_0=0$ then the Repetition Cycle is $t_3$ seconds in duration). A given receiver will derive the value of i.e., the starting point of its ERO 502 within the first repetition cycle 500, based on the algorithm such as the example disclosed below, which uses the receiver's RAI. The duration $t_1$ to $t_2$ can be pre-established. (known to the receiver by virtue of its being licensed to employ the DRM system), as is the definition of the algorithm itself. The duration $t_1$ to $t_2$ can be considered to be duration of the "window of opportunity" for reception of an EMM within this Repetition Cycle.

A short window of opportunity is best for the receiver, so that it does not need to spend too much idle time waiting for the EMM. A short window may be difficult to achieve for the broadcaster, because it involves careful scheduling of delivery of the EMMs. A number something like five minutes may be a good compromise. Note that FIG. 5 is not drawn to proper time scale.

In every case (e.g. for any algorithm chosen and agreed), the value of the RAI is used by both the receiver and the broadcaster to derive the one or more EDOs to be offered in a given month.

Figure 6:
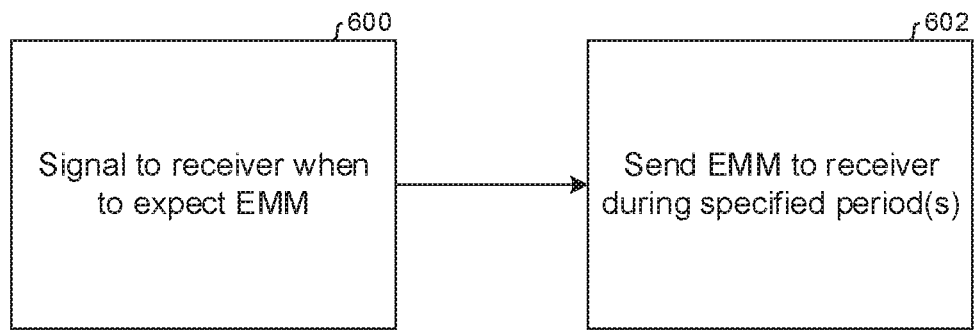
FIG. 6 is a flow chart showing example overall logic of the broadcaster in delivering EMMs.
Figure 7:
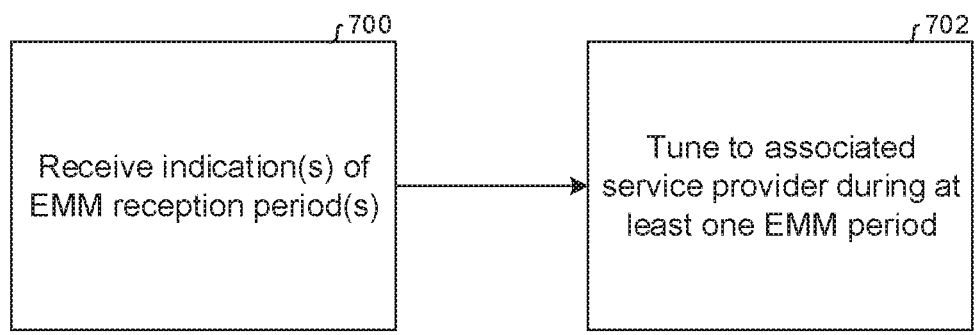
FIG. 7 is a flow chart showing example overall logic of the receiver in obtaining EMMs.
Figure 8:
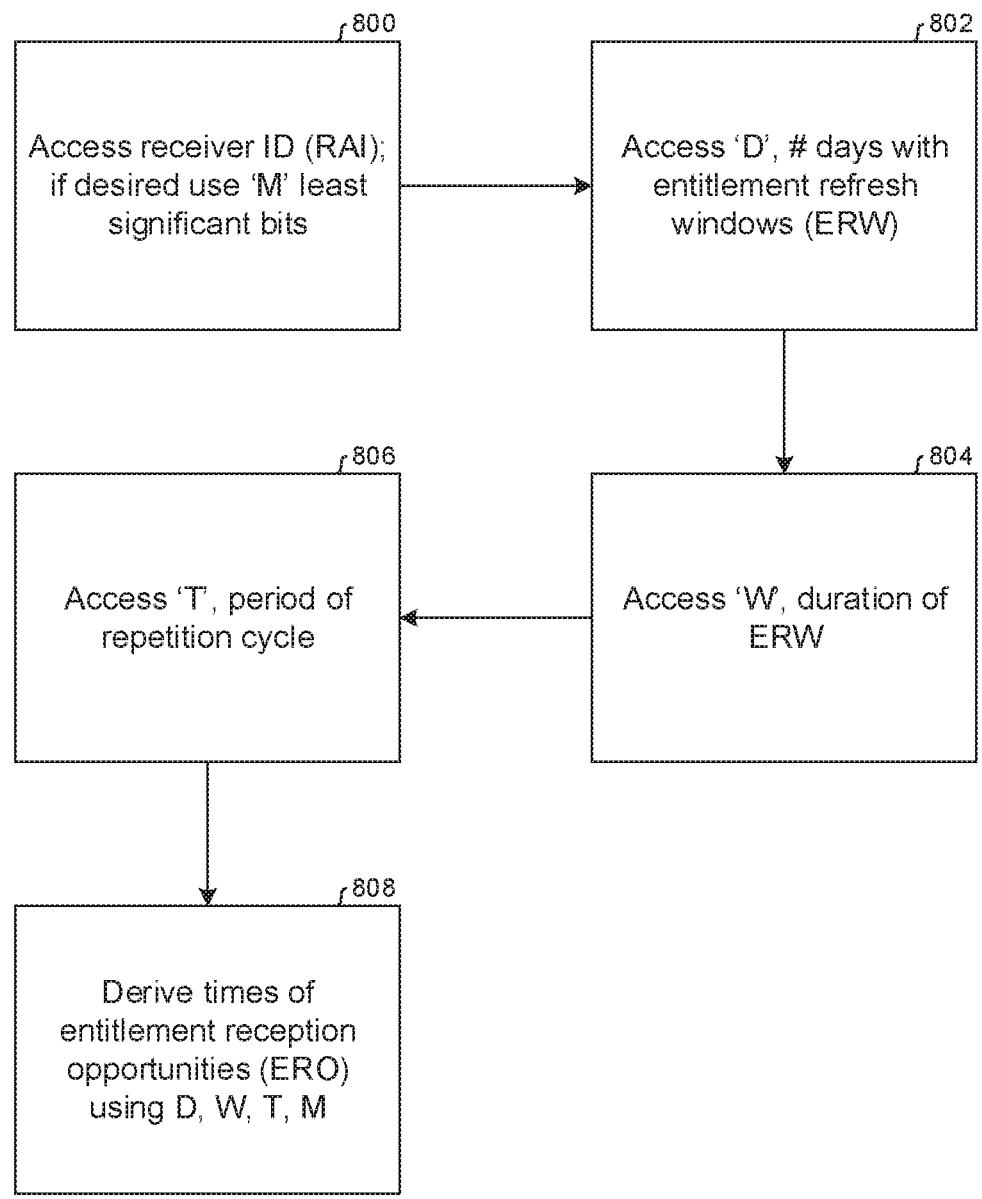
FIG. 8 is a flow chart showing example logic in determining entitlement reception opportunities for receiving EMMs based at least partially on a receiver identification.

Given the timing structure illustrated in FIG. 5, attention is drawn to FIGS. 6-8. FIG. 6 illustrates overall logic that the service provider system, which includes one or more computers and transmitters, employs while FIG. 7 shows the overall logic a receiver employs.

Commencing at block 600, the service provider provides certain transmission information to the receiver. This may be done via signaling as described above or less optimally at manufacture time or other time. At block 602 the service provider broadcasts the necessary DRM elements such as EMMs to the specified receiver during the periods that the example algorithm below, executed by both the service provider and receiver, calculates based on the identification of the receiver.

FIG. 7 shows that the receiver at block 700 receives the indications of EMM reception periods and then at block 702 uses the same algorithm to determine when to tune to the service provider to receive EMMs or other appropriate DRM information, FIG. 8 illustrates in more detail from the receiver's end, it being understood that the same algorithm is implemented by the service provider to know when to send EMMs to the particular receiver. Commencing at block 800, the receiver identification (referred to herein as RAI) is accessed. If desired, the entire RAI may be used in subsequent steps, or only a portion thereof, such as, for example, the "M", least significant bits of the RAI, wherein "M" is an integer greater than zero and less than the full length of the RAI. In an example, M=8.

Moving to block 802, the number of days "D" that contain entitlement refresh windows (ERW) such as the ERW 402 shown in FIG. 4 is accessed. "D" is thus an integer greater than zero.

Proceeding to block 804, a duration "W" (typically in number of seconds) of the repetition cycle 500 of FIG. 5 is accessed. At block 806 the period "T" of the repetition cycles is accessed. Then at block 808 one or more of the parameters accessed in blocks 802-80 are combined with the RAID accessed at block 800 to derive the times of EROs 502 at which to tune to the service provider, such as by configuring a tuner to tune to a channel affiliated with the service provider.

An example algorithm is as follows. Given

M=the 8 least significant bits of the RAI (a number in the range 0 to 255) known to both the broadcaster and the receiving apparatus D=the number of days containing ERWs, communicated by signaling or pre-established W=the duration of each ERW in seconds, communicated by signaling or pre-established T=the value of the Repetition Cycle in seconds, communicated by signaling or pre-established The location of each ERO within the Concatenated ERW Timeline can be derived as follows:

L is the duration, in seconds, of the Concatenated ERW Timeline, equal to D*W

N is the number of EDOs in the month. N is equal to L/T with any fractional part discarded)

```
•       for (i=0; i<N; i++) {
    t[i] = i*T + (M*T/256)
    }
``` where t[i] represents a time, within the Concatenated ERW Timeline, corresponding to the beginning of an ERO.

Therefore, in this example the first ERO will begin at M*T/256 seconds, the second ERO will begin at T+(M*T/256) seconds, etc. Each will last for T/256 seconds.

For each ERO the receiver will use in attempting to retrieve the monthly EMM, the receiver acquires the broadcaster's signal at the beginning of the ERO and continues to monitor to retrieve EMMs for the duration of the ERO period, or (in some embodiments) until the needed EMM is acquired.

The system described is designed with robustness in mind, recognizing that each receiver to which an EMM will be targeted will not be able to be tuned to the broadcast during every window in which it is delivered but still delivers needed EMMs to receivers. For example, a receiver may be unplugged or tuned to a different broadcaster's signal at any given time, and unable to retune to the broadcast station at the derived time. Furthermore, even when the receiver is tuned to the broadcaster's signal during a designated period, reception conditions may impede the correct reception of any particular broadcast message. To address these issues, two robustness methods may be employed:

1. The algorithm may result in a particular receiver determining that there are multiple periods of time during the month in which an EMM of interest may be received. If the receiver is unable to access it at the first opportunity, other opportunities may be used. This robustness method involves the value of a parameter called the Reception Apparatus Availability Factor (RAM). Higher values of RAM indicate greater opportunities to receive the EMM, but at a cost in the broadcaster's efficiency in use of their broadcast bandwidth.

2. Broadcast of each EMM may be repeated during the derived reception window to mitigate possible errors in the receiver's reception of the data. This robustness method is called the Entitlement Signal Robustness Factor (ESRF). For example, if the value of ESRF is three, the receiver has three opportunities to receive the EMM during each short period of time that it is being sent.

The ATSC 3.0 transport system is defined in A/331. The ATSC system uses a transport signaling method based on delivery of media files and Media Presentation Descriptions (MPDs) as defined by MPEG DASH, ISO/IEC 23009-1. The DASH Interoperability Forum (DASH-IF) has developed guidelines for use of DASH in the ATSC 3.0 broadcast system.

According to these guidelines, an ATSC 3.0 service that requires support for a Digital Rights Management (DRM) system identifies that service as "protected" by including an attribute called Service@protected in the Service List Table (SLT). See A/331 Section 6.3. Furthermore, the DASH MPD may include a Content Protection Descriptor (CPD) to identify services or service components (e.g. audio, video, or caption tracks) that are protected. Each CPD is labeled with a DRM System ID to uniquely identify the DRM system (see the DASH-IF ATSC 3.0 Guidelines, Section 7.5.2).

The CPD can be a convenient way for the DRM system provider to communicate values for the parameters indicated above as potentially "communicated by signaling".

The following is an example ContentProtection descriptor element as it can appear in an MPD.

```
<ContentProtection      schemeIdUri="urn:uuid:9a04f079-9840-4286-ba29-
e65be0885f95" value="SystemA  1.0"       systemA:ERWdayCount="28"
systemA:ERWstartTime="0:01"       systemA:ERWendTime="5:01"
systemA:repCycle="36000"/>
```

This ContentProtection descriptor identities the following parameters:

The @schemeIdUri attribute reflects an urn: value corresponding to a DRM System ID associated with a DRM system called "SystemA" in this example;

The @value attribute further identifies the CPD as associated with version 1.0 of SystemA.

For example, MPEG has defined an URN referencing its Common Encryption (CENC) DRM system as "urn:mpeg:cenc:2013". To include attributes specific to CENC in the ContentProtection element, such attributes can be prefixed with the namespace associated with this URN. The signaling may be implemented as illustrated in the following simplified example in which an audio stream is protected. Note the xmlns attribute at the beginning of the MPD element. It associates "cenc:" as the namespace associated with the CENC URN.:

```
<MPD
    xmlns:cenc="urn:mpeg:cenc:2013" type="static">
    <Period>
        <AdaptationSet mimeType="audio/mp4">
            <ContentProtection schemeIdUri="urn:mpeg:dash:mp4protection:2011"
                value="cenc"      cenc:default_KID="0b630844-cb17-496a-9700-
3702e1d23ee2"/>
            </ContentProtection>
            Representation bandwidth="134878" id="audio">
            <SegmentList duration="4000" timescale="1000">
                <Initialization sourceURL="audio/init.mp4"/>
                <SegmentURL media="audio/seg-0000.m4f"/>
                <SegmentURL media="audio/seg-0001.m4f"/>
                <SegmentURL media=" audio/seg-0002.m4f"/>
            </SegmentList>
        </Representation>
    </AdaptationSet>
    </Period>
</MPD>
```

The @systemA:ERWdayCount attribute provides a count of the number of days in the month containing ERWs.

The @systemA:ERWstartTime attribute provides the time of day, in local time, in 24-hour "hh:mm" format, of the start of an ERW on a given day; "0:00" represents midnight;

The @systemA:ERWendTime provides the time of day, in local time, in 24-hour "hh:mm" format, of the end of an ERW on a given day;

The @systemA:repCycle represents a duration, in seconds of the repetition cycle.

Using the calculations from the above example:

D=the number of days containing ERWs is communicated by @ERWdayCount

W=the duration of each ERW in seconds is communicated by computing the time difference between @ERWendTime and @ERWstartTime.

T=the value of the Repetition Cycle in seconds is communicated by @repCycle.

Note that in the example ContentProtection descriptor given here, the attributes with the prefix "SystemA:" are defined by and associated with this particular DRM system. The "SystemA:" notation indicates an XML namespace. Elsewhere in the MPD in which this ContentProtection element appears, an XML namespace identifier may be implemented associating "SystemA" with a URI (Uniform Resource Identifier) unambiguously referencing the System A DRM. An URN (Uniform Resource Name) is one type of URI that can be used for this purpose.

Accordingly, the attribute in the ContentProtection element "cenc:default_KID="0b . . . " is identified as being defined within the MPEG Common Encryption DRM system.

As noted, the receiver is expected to monitor the broadcast emission during an ERO to recover EMMs. In ATSC 3.0, EMMs are file objects delivered using the ROUTE protocol specified in A/331. It is advantageous to the design of the reception apparatus to be able to quickly determine whether or not a given file is targeted to that receiver. U.S. patent application Ser. No. 15/680,068, owned by the instant assignee and incorporated herein by reference, discusses delivery of EMMs.

Accordingly, it may now be appreciated that the instant disclosure provides an efficient method for delivery of DRM-related information over a broadcast one-way) communication path that is applicable to ATSC 3.0 broadcasts. The instant disclosure furthermore optimizes a receiver's scheduling and use of limited resources (such as a single tuner), and customizes parameters based on system factors including the total number of receivers needing access to broadcast EMMs and the amount of broadcast bandwidth desired to be used. Techniques are provided to maximize the chances of successful delivery of the EMM, such as the repetition factors. An example algorithm is disclosed for use by both broadcaster/system operator and receiver manufacturer to derive optimal timing for the reception of DRM-related information. The algorithm may be based on information specific to an individual receiver (or class of receivers), such as a serial number or unit identifier (or model number).

It will be appreciated that whilst present principals have been described with reference to some example embodiments, these are not intended to be limiting, and that various alternative arrangements may be used to implement the subject matter claimed herein.

What is claimed is:

1. A method comprising:
   calculating, at a reception apparatus, one or more entitlement reception opportunity periods based at least in part on combining an identification of the reception apparatus with information received from a service provider associated with a broadcast signal;
   based on determining one or more entitlement reception opportunity periods, configuring a receiver in the reception apparatus to receive the broadcast signal during at least one of the entitlement reception opportunity periods;
   accessing at least one digital rights management (DRM) element in the broadcast signal during the at least one of the entitlement reception opportunity periods; and
   using the DRM element to configure the reception apparatus to play content from the service provider.

2. The method of claim 1, wherein the information received from the service provider comprises transmission scheduling information.

3. The method of claim 2, wherein the transmission scheduling information comprises a number of days with entitlement refresh windows during which the DRM element is broadcast.

4. The method of claim 2, wherein the transmission scheduling information comprises a duration of at least one entitlement refresh window during which DRM element is broadcast.

5. The method of claim 2, wherein the transmission scheduling information comprises a period of at least one repetition cycle of DRM element broadcast.

6. The method of claim 2, wherein the broadcast signal comprises an advanced television systems committee (ATC) 3.0 signal.

7. The method of claim 1, wherein the DRM element comprises at least one Entitlement Management Message (EMM).

8. A computer memory that is not a transitory signal and that comprises instructions executable by at least one processor to:
   calculate, at a reception apparatus, one or more entitlement reception opportunity periods based at least in part on combining an identification of the reception apparatus with information received from a service provider associated with a broadcast signal;
   based on determining one or more entitlement reception opportunity periods, configure a receiver in the reception apparatus to receive the broadcast signal during at least one of the entitlement reception opportunity periods;
   access at least one digital rights management (DRM) element in the broadcast signal during the at least one of the entitlement reception opportunity periods; and
   use the DRM element to configure the reception apparatus to play content from the service provider.

9. The computer memory of claim 8, wherein the information received from the service provider comprises a number of days with entitlement refresh windows during which the DRM element is broadcast.

10. The computer memory of claim 8, wherein the information received from the service provider comprises a duration of at least one entitlement refresh window during which the DRM element is broadcast.

11. The computer memory of claim 8, wherein the information received from the service provider comprises a period of at least one repetition cycle of DRM element broadcast, or a duration of at least one entitlement refresh window during which a DRM element is broadcast, or both a period of at least one repetition cycle of DRM element broadcast and a duration of at least one entitlement refresh window during which a DRM element is broadcast.

* * * * *